United States Patent [19]

Kobayashi et al.

[11] Patent Number: 4,823,207

[45] Date of Patent: Apr. 18, 1989

[54] PCM RECORDING AND PLAYBACK WITH VARIABLE READ AND WRITE SPEEDS

[75] Inventors: Masaharu Kobayashi; Takao Arai, both of Yokohama, Japan

[73] Assignee: Hitachi, Ltd., Tokyo, Japan

[21] Appl. No.: 9,293

[22] Filed: Jan. 30, 1987

[51] Int. Cl.$^4$ .......................... G11B 20/10; H04N 5/95
[52] U.S. Cl. ............................................ 360/32; 360/8; 360/9.1; 360/51
[58] Field of Search ........................ 360/8, 32, 51, 9.1; 340/347 M

[56] References Cited

U.S. PATENT DOCUMENTS

| | | | |
|---|---|---|---|
| 4,206,476 | 6/1980 | Hashimoto | 360/32 |
| 4,492,989 | 1/1985 | Watanabe et al. | 360/32 |
| 4,562,488 | 12/1985 | Koyama et al. | 360/32 |
| 4,620,238 | 10/1986 | Gaskell et al. | 360/8 |
| 4,719,521 | 1/1988 | Juso | 360/32 |

FOREIGN PATENT DOCUMENTS

| | | |
|---|---|---|
| 0086658 | 8/1983 | European Pat. Off. . |
| 0142613 | 5/1985 | European Pat. Off. . |
| 0146773 | 7/1985 | European Pat. Off. . |
| 0178075 | 4/1986 | European Pat. Off. . |
| 0179920 | 5/1986 | European Pat. Off. . |
| 2152269 | 7/1985 | United Kingdom . |
| 2175731 | 12/1986 | United Kingdom . |

Primary Examiner—Alan Faber
Assistant Examiner—Surinder Sachar
Attorney, Agent, or Firm—Antonelli, Terry & Wands

[57] ABSTRACT

A method and an apparatus for recording and reproducing a PCM audio signal either alone or together with a video signal, using a rotary-head type scanner. An analog audio signal is converted into a digital signal having a predetermined number of quantization bits in each predetermined sampling period. The digital signal is recorded on a recording medium such as a magnetic tape, and an analog audio signal is reproduced from the digital signal reproduced from the recording medium. In the reproducing mode, the signal reproduced from the tape is written into a memory where error detection, correction and deinterleaving are carried out, and the signal is then read from the memory and applied to a D/A converter. The write rate from the memory depends on the video field period, and the read rate depends on the sampling period. Accordingly, the difference between the write address and the read address of the memory depends on the difference between the field period and the sampling period. By changing a master clock, which defines the sampling period controlled by the read address, in accordance with the address difference, the difference between the video signal field period and the audio signal sampling period can be controlled and compensated.

3 Claims, 7 Drawing Sheets

PCM RECORDING AND PLAYBACK WITH VARIABLE READ AND WRITE SPEEDS

CROSS-REFERENCES OF THE RELATED APPLICATIONS

This application relates to a U.S. application (corresponding to the European Patent application No. 86115708.9 filed Nov. 12, 1986) Ser. No. 929,909 filed Nov. 13, 1986, by Takao ARAI, Masaharu KOBAYASHI, Nobutaka AMADA, Yasufumi YUMDE and Hiroaki TAKAHASHI, entitled "METHOD AND APPARATUS FOR PCM RECORDING AND REPRODUCING AUDIO SIGNAL", and assigned to the present assignee, based on Japanese Patent Application Nos. 60-252740, 60-252741, 60-252742, 61-3429 and 61-10054, of which the disclosure is incorporated by reference herein.

BACKGROUND OF THE INVENTION

The present invention generally relates to recording and reproducing of a PCM audio signal, and more particularly to a method and an apparatus for recording and reproducing a coded audio signal, either alone or together with a video signal, to and from a magnetic tape by a rotary magnetic head type scanner, and still more particularly to a method and an apparatus for recording and reproducing a PCM audio signal which are suitable for use when the sampling frequency for the PCM audio signal and the rotation frequency of the scanner are asynchronous.

The recording and reproducing of the PCM audio signal have been adopted in order to improve the quality of the audio signal accompanied with video.

For example, an 8 mm video recorder might utilize an audio PCM system. The sampling frequency of the audio PCM signal is two times as high as the repetition frequency of the horizontal synchronization signal. It is different from an internationally common sampling frequencies (32 kHz, 44.1 kHz or 48 kHz). For example, the sampling frequency of an audio PCM signal in a satellite broadcast is 32 kHz or 48 kHz.

On the other hand, in a MUSE system, which is one transmission systems for a high grade television system, the sampling frequency of the audio PCM signal is 32 kHz or 48 kHz. Thus, if data sampled at the above sampling frequency are to be recorded field by field, the number of data per field includes a fraction. In order to resolve this problem, a packet transmission system having a leap field to absorb the excess has been adopted, as disclosed in NHK Technical Journal 27-7, page 282.

In a video disk, the PCM audio signal is recorded at the sampling frequency of 44.1 kHz with the same format as that of a compact disk.

However, when the PCM signal is to be recorded by an apparatus such as a video tape recorder which records or transmits the signal discontinuously in time, the following problems arise. First, when the field frequency of the video signal is not an integral multiple of the sampling frequency of the audio signal, the problem described above is encountered in coding. While a solution such as the MUSE system described above has been proposed, there must be a synchronous relationship between the field frequency fv of the video signal, or the rotation frequency $f_D$ of the head scanner which rotates synchronously with the field frequency, and the sampling frequency $f_s$ of the video signal. This imposes a limitation on the system application range.

As an apparatus for PCM recording and reproducing only the audio signal by a rotary head type VTR, a consumer PCM encoder/decoder (registered in September 1983) of the Japanese Electronic Industries Association Technical Standard CPZ-105 is known. A recording and reproducing apparatus in accordance with the above Technical Standard is disclosed in the article "Digital Audio/Video Combination Recorder Using Custom Made LSI's, IC's" presented at the 69th Convention, 1981 May 12-15, Los Angles AES 1791 (B-6), particularly FIGS. 1 and 14. In this article, in the NTSC system, the field frequency $f_v$ and the sampling frequency $f_s$ are divided from the same master clock and they have a relationship of $f_s = 735 f_v$. Accordingly, the number of samples per field is constant at 735.

FIG. 1 of the above article shows a block diagram of one configuration of an apparatus for recording and reproducing sampled PCM signals. An address in a RAM, which serves as an interleaving memory, is controlled by an address control circuit.

However, when the PCM audio signal is to be recorded together with a video signal by a rotary head helical scan type VTR, if the video signal is a 525 lines/60 fields television signal, the field frequency ($f_v = 59.94$ Hz) is not an integral multiple of the sampling frequency ($f_s = 32$ kHz, 48 kHz), and the number of blocks per field includes a fraction.

As a result, a block set, which is an aggregation of a predetermined number of blocks for processing the signal, such as by interleaving and deinterleaving, is separated between the fields, and this is inconvenient.

A rotary head type digital audio type recorder (R-DAT) for recording only the audio signal is known, and a portion of its specification has been published in "Technical Standard of Rotary Head System (R-DAT)", Dempa Shimbun, Oct. 7, 1985, page 48.

In each of the above cases, it is assumed that the field frequency $f_v$ and the sampling frequency $f_s$ have a certain relationship and there is no discussion of the case where $f_v$ and $f_s$ are not correlated.

In the prior art techniques described above, the sampling frequency of the video signal is not the internationally common sampling frequency, the number of quantized bits is small, and the sampling frequency of the audio signal and the field frequency have a synchronized relationship. Thus, when a video signal from a camera and a digital signal from a compact disk are to be recorded together, it is very difficult to simultaneously record them because the sampling frequencies are different and there is no synchronous relationship between the sampling frequency and the field frequency.

A solution to the above problem has been proposed in British Patent Application No. 423452 filed on Sept. 17, 1984 (JP-A-61-73207). Since it has not been published before the present invention, it is not cited herein as prior art.

SUMMARY OF THE INVENTION

It is an object of the present invention to provide a video tape recorder and a digital/audio signal processing method and apparatus which can record and reproduce a digital audio signal having internationally common sampling frequency under a video field frequency which is not synchronous with the sampling frequency.

The above object is achieved by recording a signal while controlling the number of audio signal samples to be recorded in each field in accordance with the ratio of a video signal field period and an audio signal sampling period, and reproducing the signal while controlling the output rate in accordance with the difference between the field period and the sampling period.

In the reproducing system, the signal reproduced from a tape is written into a memory where error correction and deinterleaving are carried out, and the signal is then read from the memory and applied to a D/A converter. The write rate to the memory depends on the video field period, and the read rate depends on the sampling period, Accordingly, the difference between the write address and the read address of the memory depends on the difference between the field period and the sampling period. By changing a master clock, which defines the sampling period controlled by the read address, in accordance with the address difference, the difference between the video signal field period and the audio signal sampling period can be controlled and compensated.

DESCRIPTION OF THE PREFERRED EMBODIMENTS

Figure 1:
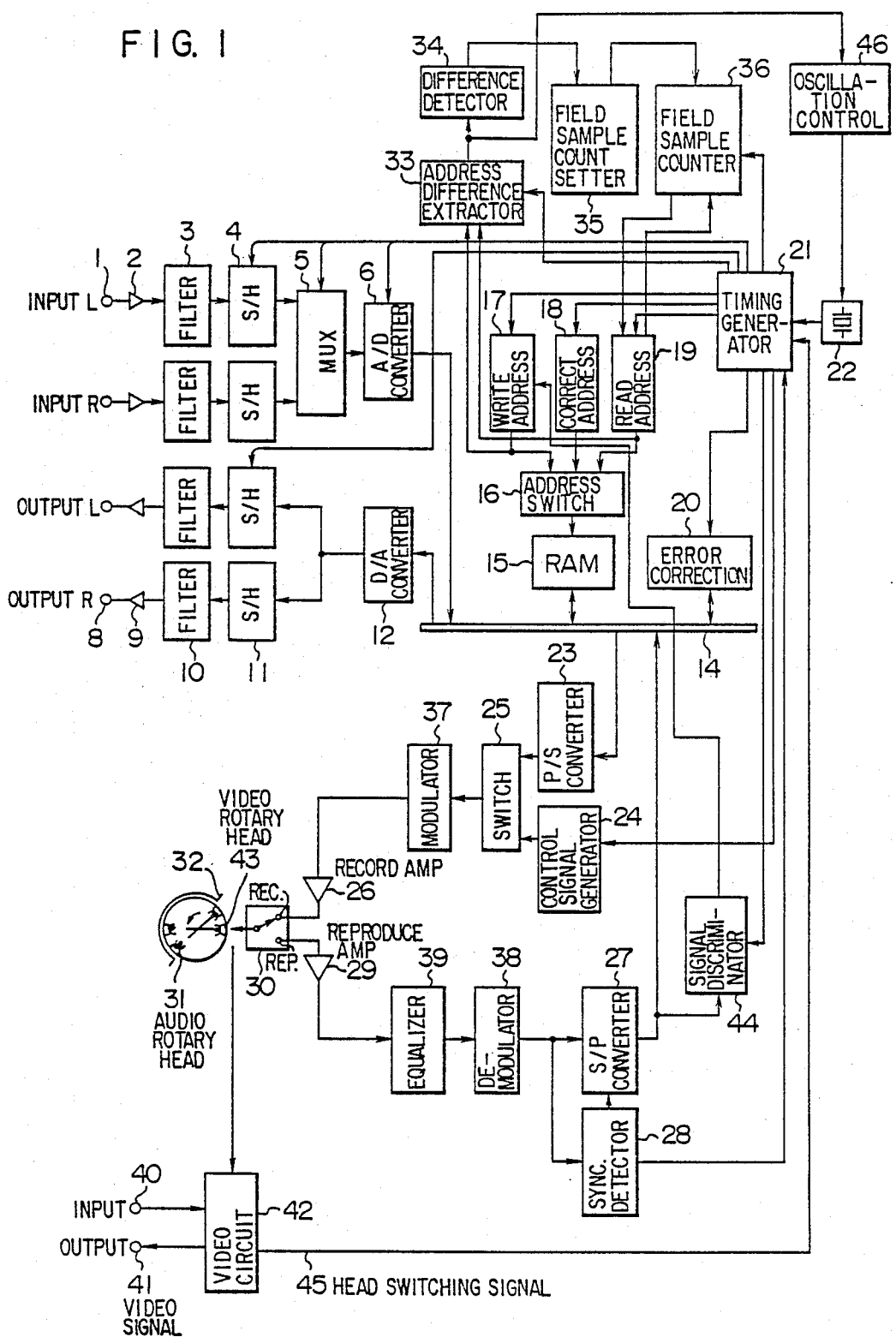
FIG. 1 shows a circuit diagram of one embodiment of the present invention.

One embodiment of the present invention is now explained with reference to FIG. 1.

In a recording mode, a 2-channel (L, R) analog signal is supplied through an input terminal 1. The input signal is amplified to a predetermined level by an amplifier 2, band-limited by a filter 3, and sampled by a sample/hold circuit 4. The sampled input signals are alternately supplied to an A/D converter 6 through a switching circuit 5, and converted to a PCM signal. The signal converted by the A/D converter 6 is written into a RAM 15 through a bus line 14. The PCM signal is arranged and an error correction code is added in accordance with a predetermined format. The error correction code is added by an error correction circuit 20. After the arrangement of the PCM code and the addition of the error correction code, the data is read from the RAM. The writing, arrangement and reading of the PCM signal and the addition of the error correction code are carried out by controlling the RAM addresses by address generation circuits 17-19 and an address switching circuit 16. The read address generation circuit 19 is controlled such that the number of audio signal samples in one field counted by a field sample counter 36 is equal to the number of samples set by a field sample count setting circuit 35 in accordance with a signal from a difference detection circuit 34 which detects the difference between the write address and the read address as extracted by an address difference extract circuit 33. The signal read from the RAM 15 is converted to a serial signal by a parallel/serial converter 23. Signals other than the audio signal, and control signals such as a synchronization signal, are added by a control signal generating circuit 24 and a switching circuit 25, and they are modulated by a modulation circuit 37. The resulting signal is amplified to a predetermined level by a recording amplifier 26 and recorded on a magnetic tape 32 by an audio rotary head 31. A switching circuit 30 switches between recording and reproducing. A timing generation circuit 21 controls the entire system by generating a timing signal from a clock signal generated by an oscillation circuit 22 and a head switching signal determined by a scanner phase.

In the reproducing mode, the switching circuit 30 is switched to reproduction, and a signal reproduced by the audio rotary head 31 is amplified to a predetermined level by a reproducing amplifier 29 and shaped by a waveform equalizer. The wave-equalized signal is demodulated by a demodulator 38 and converted to a digital signal. The demodulated digital signal is detected for a synchronization signal by a synchronization detection circuit 28 and converted to a parallel signal by a parallel/serial converter 27. The detected synchronization signal is used as a reference to reproduce data. A signal discriminator 44 discriminates the parallel-converted data to determine whether it is an audio signal or other signal. Only the audio signal is stored in the RAM 15 where data are arranged and error correction is made by the error correction circuit 20. The error-corrected data is read from the RAM 15 and supplied to the D/A converter 12 through the bus line 14. The writing to the RAM 15, error correction and reading from the RAM 15 are carried out by controlling the addresses of the RAM 15 by the address generation circuits 17-19 and the address switching circuit 16. The difference between the write address and the read address is extracted by the address difference extract circuit 33, and a control signal for the clock generated by the oscillation circuit 22 is generated by an oscillation control circuit 46 based on the output signal of the address difference extract circuit 33. The analog data converted by the D/A converter 12 is resampled for each channel by the sample/hold circuit 11. The resampled analog signals are supplied from an output terminal 8 through a filter 10 and an amplifier 9.

In the record mode, the video signal is supplied from an input terminal 40, converted to a predetermined signal by a video circuit 42 and recorded on the tape 32 by a video rotary head 43. In the reproducing mode, the signal reproduced by the video rotary head 43 is converted to a predetermined signal by the video circuit 42 and outputted from an output terminal 41.

With this arrangement, the number of audio signal samples recorded in one field in the record mode and the output rate of the audio PCM signal in the reproducing mode are controlled in accordance with the difference between the write address and the read address of the memory so that asynchronization between the sampling period and the field period is absorbed.

Figure 2:
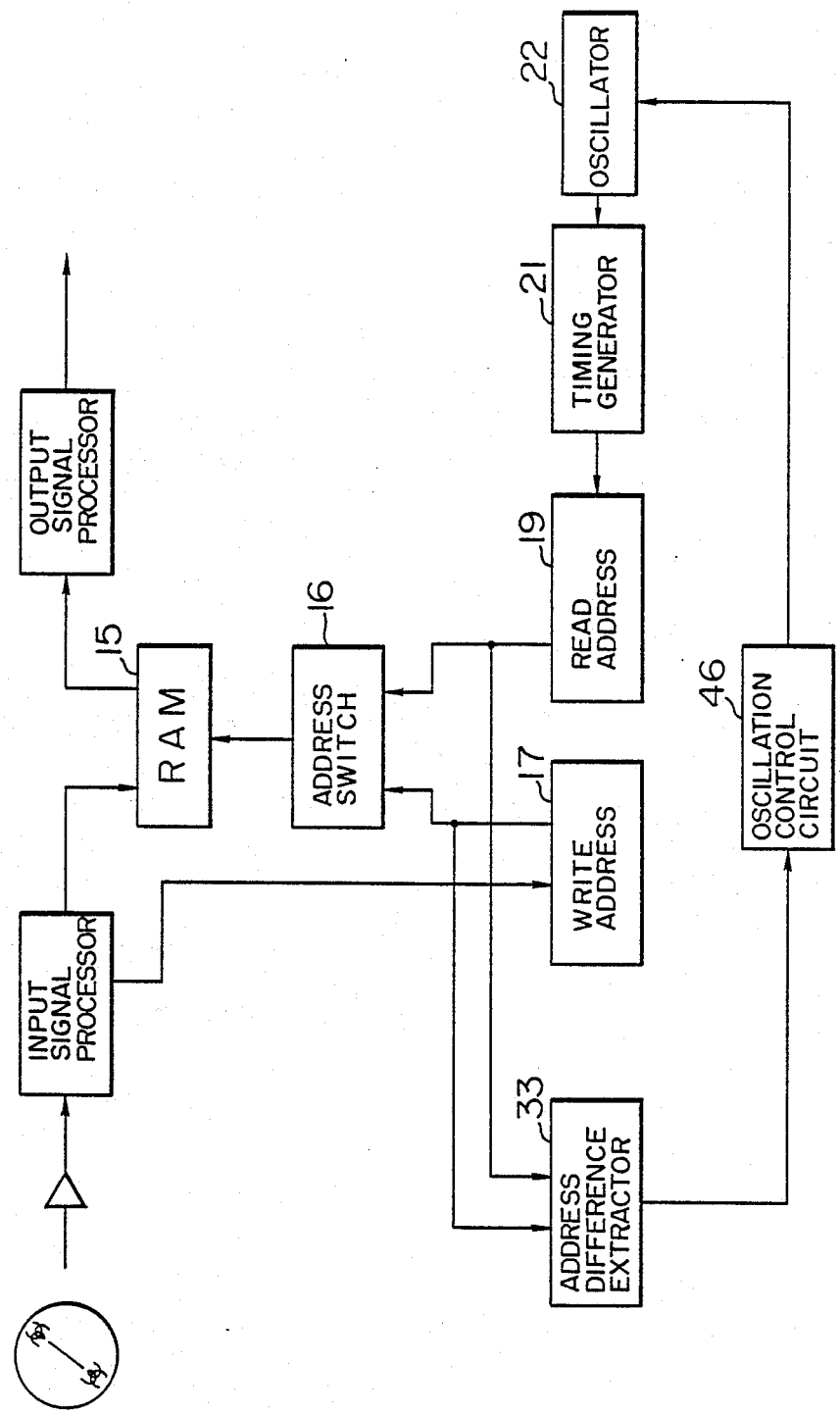
FIG. 2 shows a partial circuit diagram of FIG. 1.

FIG. 2 shows a block diagram of one embodiment of equipment synchronizing a video signal system and an audio PCM signal system in the reproducing mode. In the present embodiment, the frequency of the oscillator 22, which generates the sampling frequency for the audio PCM signal is controlled by the difference between the sampling period and the video signal period.

The write address at which the reproduced signal is recorded in RAM 15 is generated by write address circuit 17 based on the signal generated by the input signal processing circuit from the reproduced signal, and it depends on the video signal period. The read address at which the audio signal is read from the RAM 15 is generated by the read address circuit 19 based on the signal generated by the timing generation circuit 21 from the clock generated by the oscillator 22, and it depends on the sampling period. Accordingly, the input rate of the audio PCM signal in the reproduced signal and the output rate of the audio PCM signal are not constant. Thus, the difference between the write address and the read address is extracted by the address difference extract circuit 33, and the signal to control the change of frequency of the clock signal generated by the oscillator 22 is generated by the oscillation control circuit 46 in accordance with the extracted signal. Namely, when the input rate of the audio PCM signal in the reproduced signal is higher than the output rate of the audio PCM signal and the difference between the write address and the read address increases, the oscillation control circuit 46 functions to increase the clock frequency generated by the oscillator 22 so that the output rate of the audio PCM signal increases. If the input rate of the audio PCM signal in the reproduced signal is lower than the output rate of the audio PCM signal and the difference between the write address and the read address decreases, the oscillation control circuit 46 functions to decrease the clock frequency generated by the oscillator 22 so that the output rate of the audio PCM signal decreases. Such a circuit may be constructed by a D/A converter and an amplifier for the oscillation control circuit 46 and by a voltage controlled oscillator for the oscillator 22. With this arrangement, the input rate of the audio PCM signal in the reproduced signal and the input rate of the audio PCM signal in the reproduced signal can be equalized.

Figure 3:
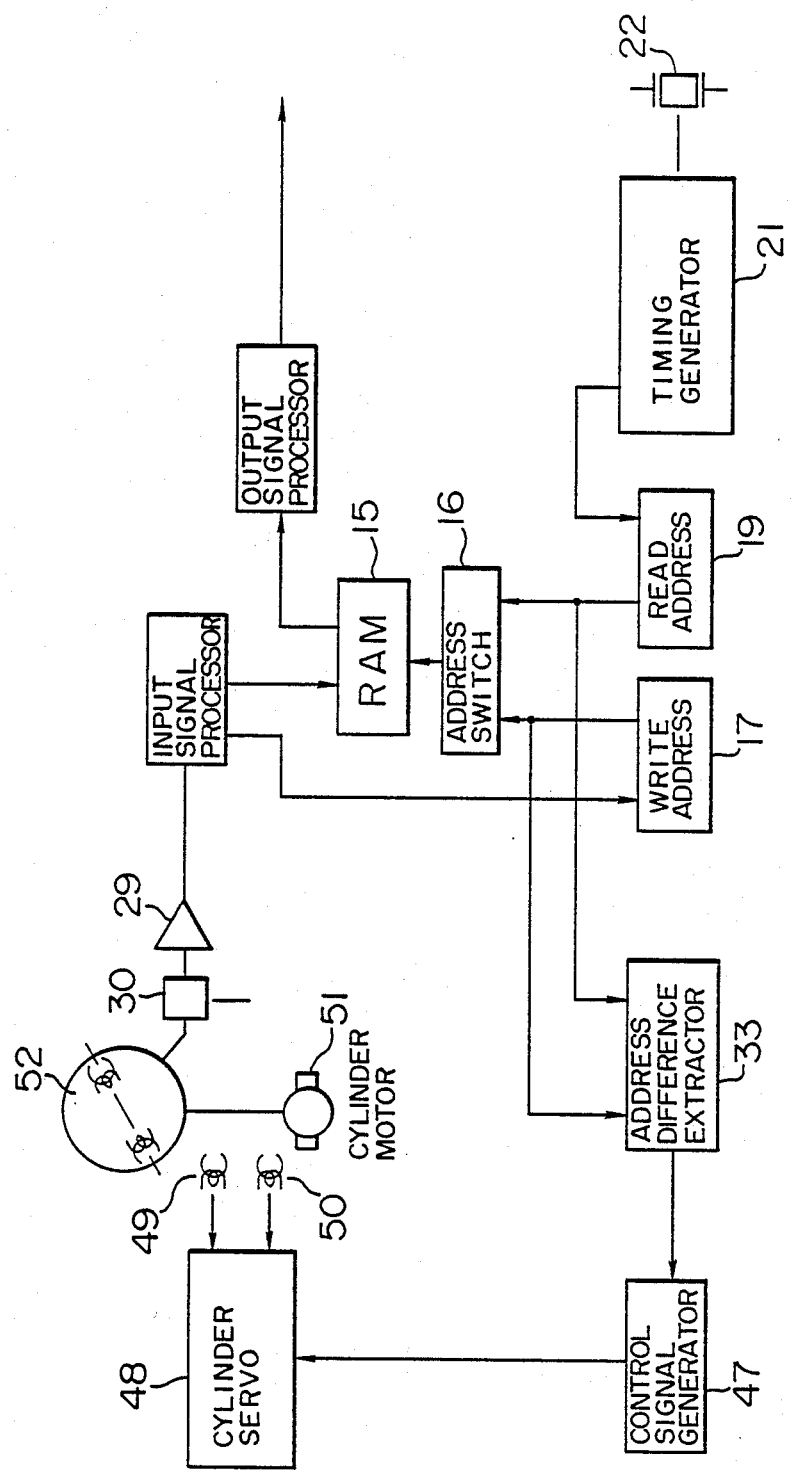
FIG. 3 shows a circuit diagram of another embodiment.

FIG. 3 shows a block diagram of another embodiment for synchronizing the video signal system and the audio PCM signal system in the reproducing mode. In the present embodiment, the sampling frequency of the audio PCM signal is generated by the crystal oscillator 22 and the difference between the sampling frequency and the video signal period is controlled by changing the rotation speed of the cylinder.

When the signals having their own master clocks for the video signal system and the audio signal system recorded in the recording mode are reproduced, the output rate of the audio PCM signal and the input rate of the audio PCM signal in the reproduced signal may not be constant if the master clocks for the two systems are independent from each other.

A similar problem may arise even if a master clock of one of the systems is shared.

In the present embodiment, the difference between the write address from the write address generator 17 at which the reproduced signal is to be recorded in the memory and the read address from the read address generation circuit 19 at which the signal is read from the memory 15 to produce the audio signal stored in the memory is extracted by the address difference extract circuit 33, and a cylinder servo control signal is generated by a control signal generation circuit 47 in accordance with the output signal of the address difference detection circuit 33.

A cylinder servo circuit 48 generates a rotation speed control signal for a cylinder motor 51 based on the cylinder servo control signal, an output signal of a pulse generator (PG) 49 of a cylinder 52 and an output signal of a frequency generator (FG) 50 of the cylinder motor 51.

A specific embodiment of the cylinder servo circuit 48 is explained.

Figure 4:
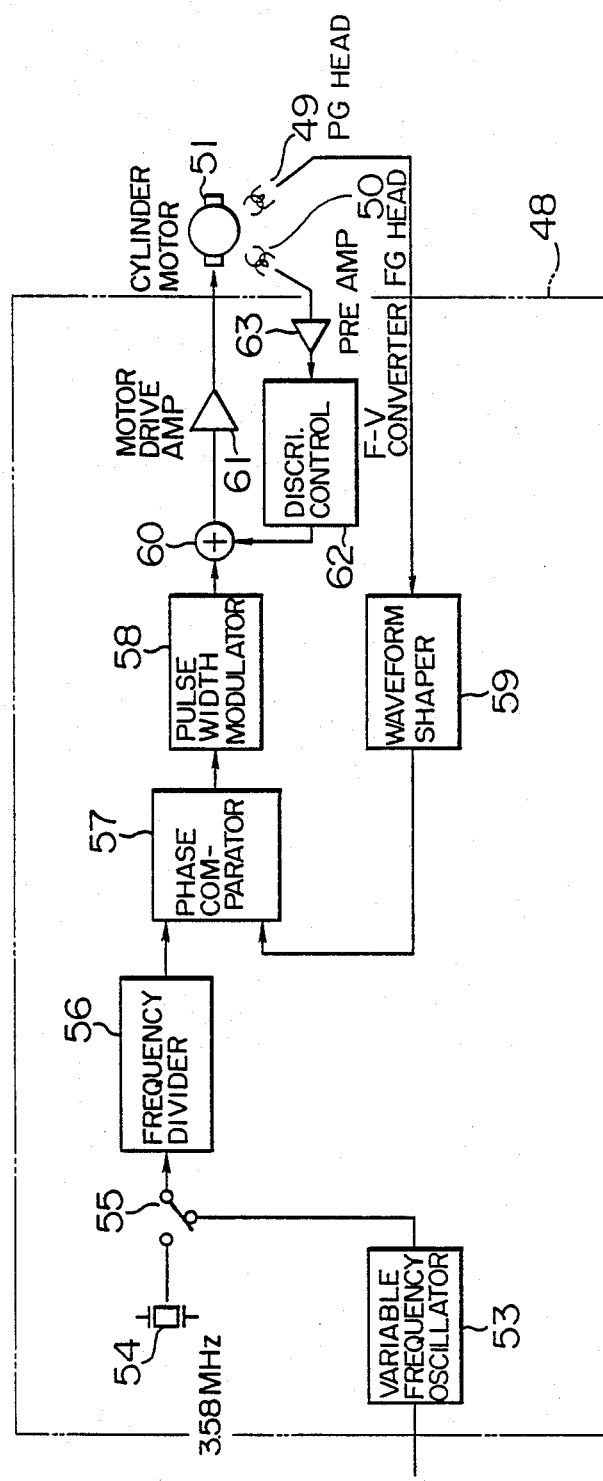
FIG. 4 shows a partial circuit diagram of FIG. 3.

FIG. 4 shows a block diagram of the cylinder servo circuit 48.

In a normal video reproducing mode, an output of a crystal oscillator 54 is selected by a switching circuit 55 and supplied to a frequency divider 56. The input signal to the frequency divider 56 may be at 3.58 MHz from which a signal of approximately 29.97 Hz is generated. A phase comparator 57 compares phases of the output of the frequency divider 56 and an output of a PG head 49 shaped by a waveform shaper 59, and a phase compare output of the phase comparator 57 is pulse-width modulated by a pulse width modulator 58. The output of the pulse width modulator 58, and an output signal of an FG head 50 amplified by a pre-amplifier 63 and frequency/ voltage-converted by a discrimination control circuit 62 are summed by an adder 60, and the sum output is amplified by a motor drive amplifier 61 to produce a cylinder motor drive signal.

In order to equalize the input and output rates of the audio PCM signal, the switching circuit 55 selects a variable frequency oscillator 53. The oscillation frequency of the variable frequency oscillator 53 is controlled by the output of the control signal generation circuit 47.

With the circuits shown in FIGS. 3 and 4, if the input rate of the reproduced audio PCM signal is higher than the output rate of the audio PCM signal, the difference between the write address and the read address is large. As a result, the variable frequency oscillator 53 is controlled to lower its oscillation frequency so that the rotation speed of the cylinder is lowered. Thus, the input rate of the audio PCM signal is lowered.

If the input rate of the audio PCM signal is lower than the output rate of the audio PCM signal, the difference between the write address and the read address is small. The control signal generator 47 thus produces a signal to raise the oscillation frequency of the variable frequency oscillator 53. As a result, the oscillation frequency rises, the rotation speed of the cylinder rises and the input rate of the audio PCM signal rises.

In this manner, the input and output rates of the audio PCM signal are equalized without regard to the operation in the record mode.

In the record and reproducing modes, the error in the ratio of the vertical synchronization signal repetition frequency fv and the sampling frequency fs of the audio PCM signal, due to the difference between the master clock pulse of the video signal system and the master clock pulse of the PCM signal system, is very small when the oscillation sources of those clock pulses are crystal oscillators. However, if the error is neglected, the error is accumulated. In the digital signal processor, since the memories for time-basis expansion/compression and interleaving/deinterleaving are cyclically used, overflow or underflow takes place between the address signal. In order to eliminate such an overflow or underflow the frequencies $f_v$ and $f_s$ are measured in the record mode, and the same frequencies as those $f_v$ and $f_s$ in the record mode are generated in the reproducing mode.

In the present invention, the frequency difference between $f_v$ and $f_s$ is not detected but the difference between the read address and the write address in the memory is detected so that the error of the ratio of $f_v$ and $f_s$ is extracted and compensated.

Figure 5:
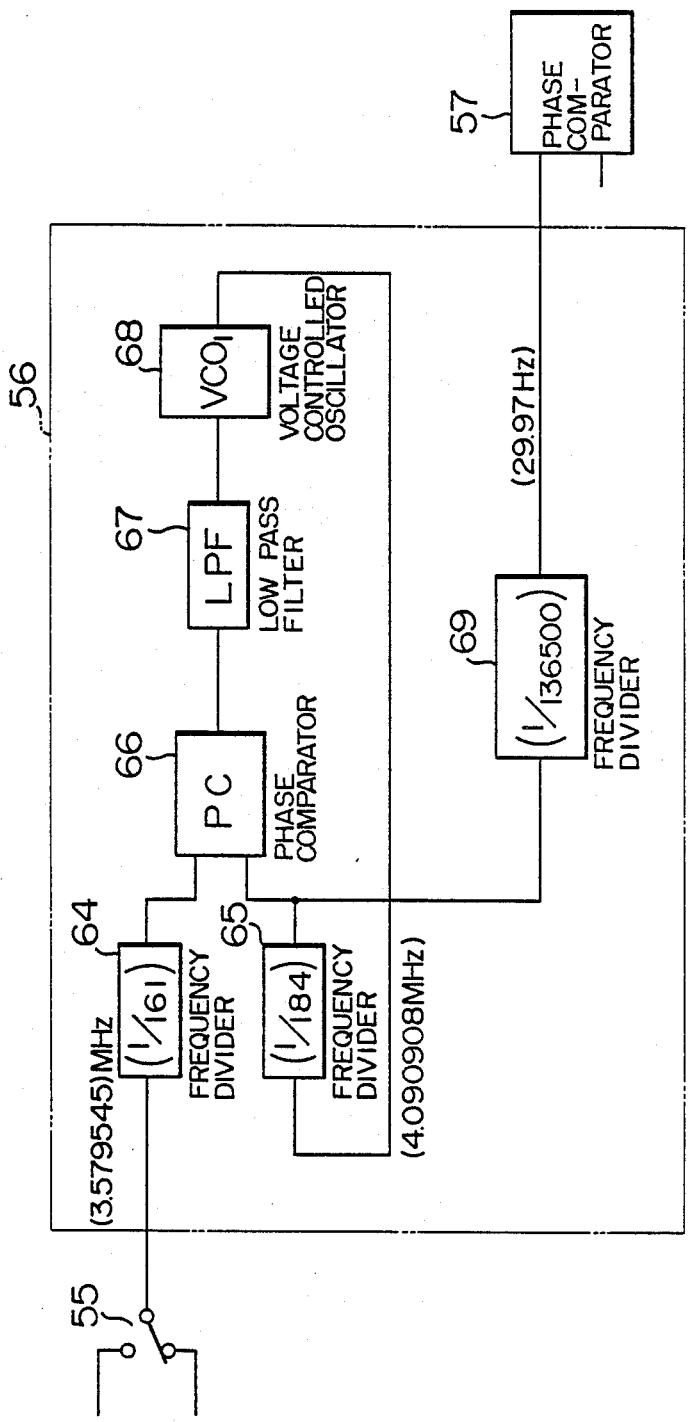
FIGS. 5 and 6 show specific circuits of the partial circuit shown in FIG. 4.

FIG. 5 shows a specific circuit diagram of a 525/60 (NTSC) system of the frequency divider.

A signal at a frequency 3.58 MHz selected by the switching circuit 55 is frequency-divided by a frequency divider 64 by a factor of 161, and the divided signal is supplied to a phase comparator 66.

An output at 4.090908 MHz of a voltage controlled oscillator 68 is frequency-divided by a frequency divider 65 by a factor of 184, and the divided signal is supplied to another input of the phase comparator 66. The phase comparator compares the phases of the input signals. The output signal of the phase comparator 66 is supplied to a low pass filter 67. The output of the low pass filter controls the oscillation frequency of the voltage controlled oscillator 68. The output of the voltage controlled oscillator 68 is also frequency-divided by a frequency divider 69 by a factor of 136,500, and the divided output is supplied to the phase comparator 57.

Figure 6:
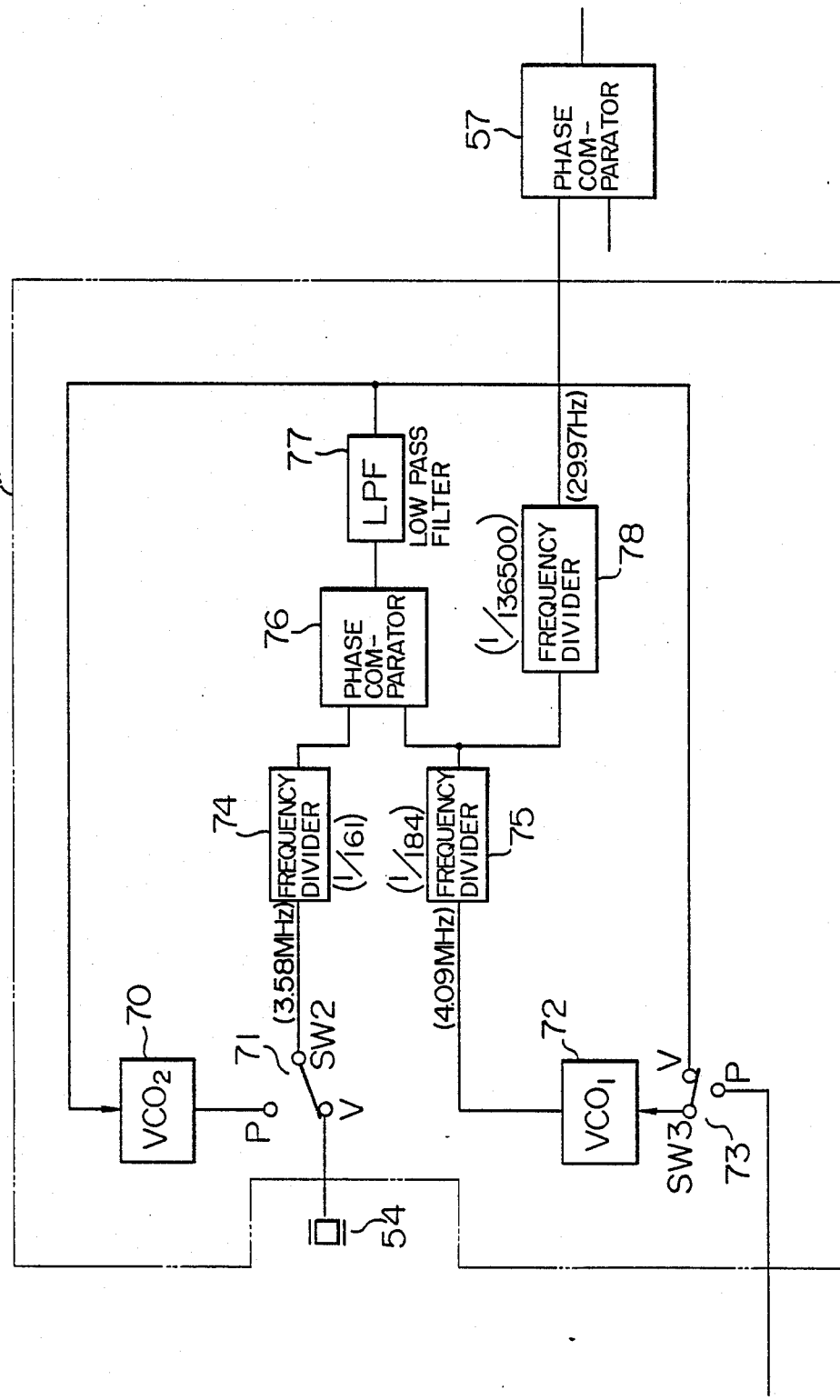

FIG. 6 shows a circuit diagram of another embodiment in which the output of the crystal oscillator 54 and the output signal of the control signal generator 47 are received to generate compare input signals to the phase comparator 57.

A frequency divider 74 selectively receives an output of the crystal oscillator 54 or an output of a variable frequency oscillator 70 through a switching circuit 71, and frequency-divides this input signal by a predetermined factor. A variable frequency oscillator 72 selects the output signal of the control signal generator 47 or an output of a low pass filter 77, through a switching circuit 73, as a frequency control signal. The output signal of the variable frequency oscillator 72 is supplied to a frequency divider 75 which frequency-divides it by a predetermined factor. The outputs from the frequency dividers 74 and 75 are supplied to a phase comparator 76 as phase compare signals. The output of the phase comparator is filtered by low pass filter 77.

The output of the low pass filter 77 is supplied to the variable frequency oscillator 70 as the frequency control signal and to one input of the switching circuit 73. The output of the voltage controlled oscillator 72 is also supplied to a frequency divider 78 which frequency-divides it by a predetermined factor.

The output of the frequency divider 78 is supplied to the phase comparator 57.

In the switching circuits 71 and 73, a position V represents a normal video mode and a position P represents an audio PCM signal reproducing mode.

The numerals in the parentheses show example for the 525/60 (NTSC) system.

Figure 7:
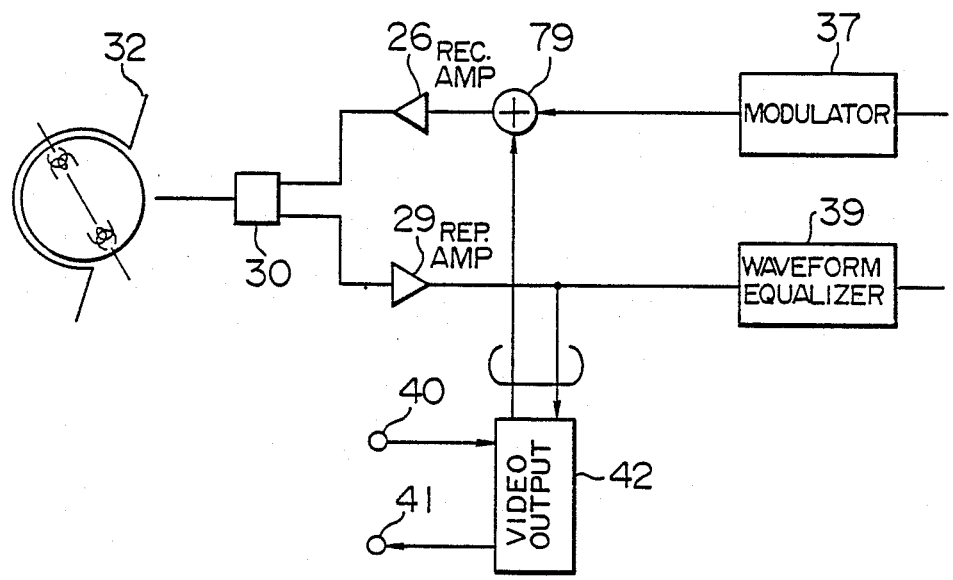
FIG. 7 shows a circuit diagram of a multi-recording system.

FIG. 7 shows an embodiment which records an audio signal multiplied with a video signal. The audio signal is multiplexed with the video signal by an adder 79, and the multiplexed signal is supplied to a record amplifier 26. Thus, the audio signal is recorded multiplexed with the video signal. The reproduced signal is amplified by the amplifier 29, and the output of the amplifier 29 is supplied to the waveform equalizer 37 and the video circuit 42. In this manner, the multiplex recording and reproducing are attained.

In accordance with the present invention, when the PCM audio signal is recorded and reproduced together with the video signal by the rotary magnetic head type scanner, it is not necessary that the rotation frequency of the head scanner and the sampling frequency of the PCM audio signal is synchronized. Accordingly, any video signal and any PCM audio signal may be recorded or reproduced in combination.

What is claimed is:

1. A method of recording and reproducing a PCM audio signal comprising:
   converting an analog audio signal at a predetermined sampling rate to a first digital signal having a predetermined number of quantization bits in each of a plurality of predetermined sampling periods;
   recording the first digital signal on a recording medium to provide a recorded signal, while controlling the drive of the recording medium with a video signal having periods asynchronous with the sampling periods, the recording including determining the number of digitized quantization bits to be recorded in each of a plurality of predetermined periods synchornous with the video signal periods on the basis of the ratio between the predetermined sampling periods and the predetermined synchronous periods, and recording the first digital signal in accordance with such determination;
   reproducing the recorded signal from the recording medium to provide a second digital signal;
   converting the second digital signal to a reproduced analog audio signal;
   determining a first output rate representative of the number of quantization bits in the second digital signal in each of the predetermined synchronous periods
   determining a second output rate representative of the number of quantization bits in the second digital signal in each of the predetermined sampling periods
   determining the difference between the first output rate and the second output rate; and
   adjusting the duration of the sampling period in accordance with the determined difference to cause the reproduced analog audio signal to correspond with the PCM audio signal.

2. Apparatus for recording and reproducing a PCM audio signal comprising:
   means for converting an analog audio signal at a predetermined sampling rate to a first digital signal having a predetermined number of quantization bits in each of a plurality of predetermined sampling periods;
   means for recording the first digital signal on a recording medium to provide a recorded signal, while controlling the drive of the recording medium with a video signal having periods asynchronous with the sampling periods, the recording means including means for determining the number of digitized quantization bits to be recorded in each of a plurality of predetermined periods synchronous with the video signal periods on the basis of the ratio between the predetermined sampling periods and the predetermined synchronous periods, and means for recording the first digital signal in accordance with such determination;
   means for reproducing the recorded signal from the recording medium to provide a second digital signal;
   means for converting the second digital signal to a reproduced analog audio signal;
   means for determining a first output rate representative of the number of quantization bits in the second digital signal in each of the predetermined synchronous periods
   means for determining a second output rate representative of the number of quantization bits in the second digital signal in each of the predetermined sampling periods means for determining the difference between the first output rate and the second output rate; and means for adjusting the duration of the sampling period in accordance with the determined difference to cause the reproduced analog audio signal to correspond with the PCM audio signal.

3. Apparatus for recording and reproducing a PCM audio signal comprising:

means for converting an analog audio signal at a predetermined sampling rate to a first digital signal having a predetermined number of quantization bits in each of a plurality of predetermined sampling periods;

means for recording the first digital signal on a recording medium to provide a recorded signal, while controlling the drive of the recording medium with a video signal having a period asynchronous with the sampling periods, the recording means including (a) a data distribution circuit having a first memory for sequentially storing the first digital signal in segments at predetermined time intervals and means for reading the stored segments from said memory and recording the read segments on the recording medium with continuous segments recorded discontinuously on the recording medium, (b) means for determining the number of continuous segments to be recorded in each of a plurality of predetermined periods synchronous with the video signal periods, (c) a formatting circuit for encoding an error detection/correction code and predetermined control signals onto each segment stored in said memory to form augmented segments, assigning the augmented segments into blocks, each block having a predetermined number of augmented segments, and providing as an output signal the blocks of augmented segments, (d) modulating means for modulating the formatting circuit output signal to provide a modulated signal, and (e) a recording circuit for recording the modulated signal on the recording medium;

means for reproducing the recorded signal from the recording medium to provide a second digital signal;

a decoding circuit for processing the second digital signal by detecting and correcting any errors therein in accordance with the detection/correction codes encoded therewith; and an output circuit including a second memory, write address generating means, and read address generating means, said output circuit responsive to write addesses from said write address generating means for storing processed signals in said second memory at such write addresses and responsive to read addresses from said read address generating means for reading processed signals from such read addresses in said second memory, said output circuit further including converting means for converting processed signals read from said second memory into an analog audio signal, comparison means for comparing read addresses from said read address generating means with write addresses from said write address generating means, and control means responsive to the comparison by said comparison means for controlling said read address generating means to adjust the rate at which processed signals are read from said second memory in accordance with such comparison, causing the analog audio signal from said converting means to correspond with the PCM audio signal.

* * * * *

UNITED STATES PATENT AND TRADEMARK OFFICE
CERTIFICATE OF CORRECTION

PATENT NO. : 4,823,207
DATED : April 18, 1989
INVENTOR(S) : Masaharu KOBAYASHI and Takao ARAI It is certified that error appears in the above-identified patent and that said Letters Patent is hereby corrected as shown below:

Please replace patent claims 1 and 2 with the following:

1. A method of recording and reproducing a PCM audio signal comprising:
converting an analog audio signal at a predetermined sampling rate to a first digital signal to provide a sample having a predetermined number of quantization bits in each of a plurality of predetermined sampling periods;
recording the first digital signal on a recording medium to provide a recorded signal, while controlling the drive of the recording medium with a video signal having periods asynchronous with the sampling periods, the recording including determining the number of samples to be recorded in each of a plurality of predetermined periods synchronous with the video signal periods on the basis of the ratio between the predetermined sampling periods and the predetermined synchronous periods, and recording the first digital signal in accordance with such determination;
reproducing the recorded signal from the recording medium to provide a second digital signal;
converting the second digital signal to a reproduced analog audio signal;
determining a first output rate representative of the number of samples in the second digital signal in each of the predetermined synchronous periods.
determining a second output rate representative of the number of samples in the second digital signal in each of the predetermined sampling periods
determining the difference between the first output rate and the second output rate; and
adjusting the duration of the sampling period in accordance with the determined difference to cause the

UNITED STATES PATENT AND TRADEMARK OFFICE
CERTIFICATE OF CORRECTION

PATENT NO. : 4,823,207

DATED : April 18, 1989

INVENTOR(S) : Masaharu KOBAYASHI and Takao ARAI

It is certified that error appears in the above-identified patent and that said Letters Patent is hereby corrected as shown below:

reproduced analog audio signal to correspond with the PCM audio signal.

2. Apparatus for recording and reproducing a PCM audio signal comprising:
    means for converting an analog audio signal at a predetermined sampling rate to a first digital signal to provide a sample having a predetermined number of quantization bits in each of a plurality of predetermined sampling periods;
    means for recording the first digital signal on a recording medium to provide a recorded signal, while controlling the drive of the recording medium with a video signal having periods asynchronous with the sampling periods, the recording means including means for determining the number of samples to be recorded in each of a plurality of predetermined periods synchronous with the video signal periods on the basis of the ratio between the predetermined sampling periods and the predetermined synchronous periods, and means for recording the first digital signal in accordance with such determination;
    means for reproducing the recorded signal from the recording medium to provide a second digital signal;
    means for converting the second digital signal to a reproduced analog audio signal;
    means for determining a first output rate representative of the number of samples in the second digital signal in each of the predetermined synchronous periods
    means for determining a second output rate representative of the number of samples in the second digital signal in each of the predetermined sampling periods
    means for determining the difference between the first

UNITED STATES PATENT AND TRADEMARK OFFICE
CERTIFICATE OF CORRECTION

PATENT NO. : 4,823,207
DATED : April 18, 1989
INVENTOR(S) : Masaharu KOBAYASHI and Takao ARAI It is certified that error appears in the above-identified patent and that said Letters Patent is hereby corrected as shown below:

output rate and the second output rate; and
means for adjusting the duration of the sampling period in accordance with the determined difference to cause the reproduced analog audio signal to correspond with the PCM audio signal.

Signed and Sealed this

Thirtieth Day of January, 1990

*Attest:*

JEFFREY M. SAMUELS

*Attesting Officer*     *Acting Commissioner of Patents and Trademarks*